United States Patent
Goto

(10) Patent No.: US 8,148,944 B2
(45) Date of Patent: Apr. 3, 2012

(54) SECONDARY BATTERY PROTECTION SEMICONDUCTOR DEVICE FOR PROTECTING A SECONDARY BATTERY

(75) Inventor: Tomoyuki Goto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 659 days.

(21) Appl. No.: 12/230,425

(22) Filed: Aug. 28, 2008

(65) Prior Publication Data
US 2009/0058365 A1 Mar. 5, 2009

(30) Foreign Application Priority Data
Aug. 29, 2007 (JP) ................. 2007-222388

(51) Int. Cl.
*H02J 7/00* (2006.01)
(52) U.S. Cl. .................. 320/128; 320/136; 320/152
(58) Field of Classification Search ............ 320/128
See application file for complete search history.

(56) References Cited

U.S. PATENT DOCUMENTS 6,208,117 B1 * 3/2001 Hibi .................. 320/134
2004/0167741 A1 * 8/2004 Iwaizono .............. 702/132
2004/0257042 A1 * 12/2004 Liu et al. ............... 320/130
2006/0076926 A1 * 4/2006 Lee ..................... 320/112

FOREIGN PATENT DOCUMENTS

| JP | 10-210672 | 8/1998 |
| JP | 2004-134287 | 4/2004 |
| JP | 2006-121900 | 5/2006 |
| JP | 2007-124775 | 5/2007 |

\* cited by examiner

*Primary Examiner* — Arun Williams
(74) *Attorney, Agent, or Firm* — Dickstein Shapiro LLP

(57) ABSTRACT

A disclosed secondary battery protection semiconductor device protects the secondary battery by detecting values of at least plural detection items corresponding to the secondary battery including the detection items of overcharge, overdischarge, charge overcurrent, discharge overcurrent, short-circuit current, and overheat; comparing the detected values with corresponding detection levels that are determined beforehand for each of the detection items; and based on the comparison results, turning on/off a discharge control transistor and a charge control transistor that are series-connected to the secondary battery. Among the plural detection items, a first value of a first detection item is detected, and a detection level of a second detection item is changed in accordance with the first value.

11 Claims, 7 Drawing Sheets

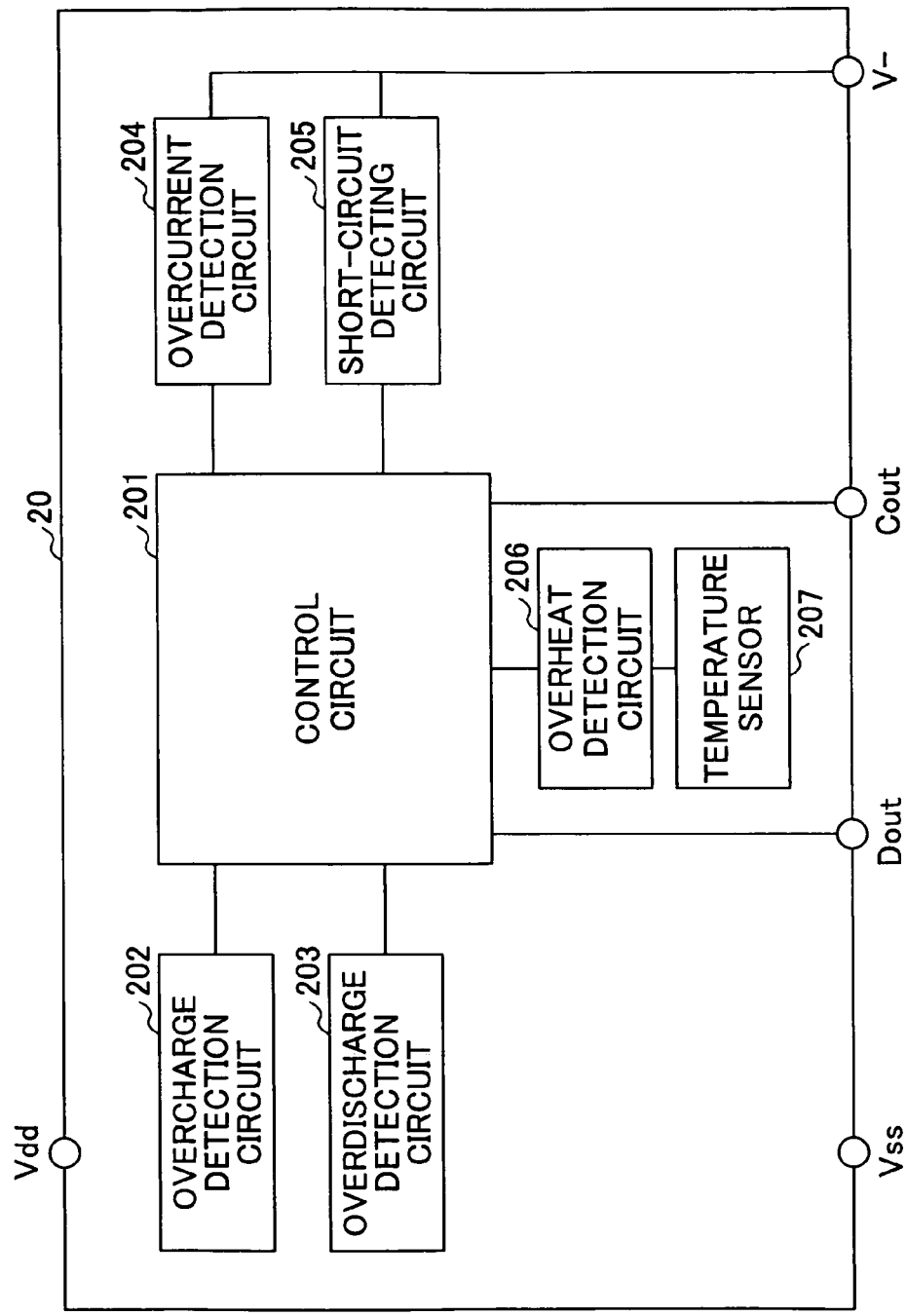

SECONDARY BATTERY PROTECTION SEMICONDUCTOR DEVICE FOR PROTECTING A SECONDARY BATTERY

BACKGROUND OF THE INVENTION

1. Field of the Invention

The present invention relates to a secondary battery protection semiconductor device for protecting a secondary battery such as a lithium-ion battery from becoming abnormal, which secondary battery is built in a battery pack used in portable electronic devices, and also to the battery pack using the secondary battery, and to various electronic devices.

2. Description of the Related Art

The recent years have witnessed the increasing pervasiveness of various electronic devices such as mobile phones, notebook computers, and PDAs (Personal Digital Assistants). In these electronic devices, battery packs are widely used as the power source as they are easy to handle.

In a battery pack, one or more secondary batteries are stored in a single package. High capacity batteries are used as the secondary batteries, such as lithium-ion batteries, lithium-polymer batteries, or nickel-hydride batteries. An extremely large amount of energy is held inside a high capacity battery. Therefore, when this battery enters an overcharge, overdischarge, or overcurrent state, the battery generates heat, or even sometimes catches fire.

Thus, the battery pack accommodates a secondary battery protection semiconductor device for protecting the secondary battery from entering overcharge, overdischarge, charge overcurrent, discharge overcurrent, short-circuit current, and anomalously heated (overheat) states. When the above protection is necessary, the connection is cut between the secondary battery and the battery charger or the load device, in order to prevent the secondary battery from generating heat or catching fire, and also to prevent the secondary battery from degrading.

For the purpose of detecting overcharge, overdischarge, charge overcurrent, discharge overcurrent, short-circuit current, and overheat states, the secondary battery protection semiconductor device includes detection circuits dedicated to each of these states. When any of these detection circuits detects an abnormal level which requires the protection operation, the corresponding detection circuit outputs a detection signal, and turns off the switch unit (charge control transistor, discharge control transistor) provided between the secondary battery and the battery charger or the load device, in order to cut the connection therebetween.

A conventional method for overheat protection is disclosed in Japanese Laid-Open Patent Application No. 2007-124775 (patent document 1). FIG. 6 illustrates a battery pack 103 with a built-in secondary battery protection device and a secondary battery 102 shown in FIG. 1 of patent document 1.

As shown in FIG. 6, the secondary battery protection device (dashed line in FIG. 6) of patent document 1 includes a control circuit 111, an overcharge detection circuit 112 for detecting an overcharge state, an overdischarge detection circuit 113 for detecting an overdischarge state, an overcurrent detection circuit 114 for detecting an overcurrent state, an overheat detection circuit 115 for detecting an overheat state, a temperature sensor 116 for measuring the temperature, a discharge control transistor Q1 for controlling discharging operations, a charge control transistor Q2 for controlling charging operations, and parasitic diodes D1 and D2 for the discharge control transistor Q1 and the charge control transistor Q2, respectively. Furthermore, the battery pack 103 includes the above-described secondary battery protection circuit and the secondary battery 102.

A brief description is given of operations of the secondary battery protection device shown in FIG. 6. Output signals from the overcharge detection circuit 112, the overdischarge detection circuit 113, and the overcurrent detection circuit 114 are input to the control circuit 111. When the control circuit 111 detects that some abnormality has occurred based on the output signals from the various detection circuits, the control circuit 111 turns on/off the discharge control transistor Q1 and the charge control transistor Q2 in accordance with the output from the detection circuit that has detected the abnormality, in order to protect the secondary battery 102.

Furthermore, when the overheat detection circuit 115 has detected an overheat state upon referring to the temperature detected by the temperature sensor 116, the control circuit 111 turns on/off the discharge control transistor Q1 or the charge control transistor Q2 to protect the secondary battery 102, the discharge control transistor Q1, and the charge control transistor Q2.

The target of detecting overheat may be the main unit of the secondary battery 102 or the discharge control transistor Q1 and the charge control transistor Q2, or all of these elements. A short-circuit detection circuit for detecting a short-circuit current may be provided in addition to the overcharge detection circuit, the overdischarge detection circuit, and the overcurrent detection circuit. Such a configuration is disclosed in, for example, Japanese Laid-Open Patent Application No. 2006-121900 (patent document 2).

Patent document 1: Japanese Laid-Open Patent Application No. 2007-124775

Patent document 2: Japanese Laid-Open Patent Application No. 2006-121900

In the conventional secondary battery protection circuits described above, the detection levels of the overcharge detection circuit 112, the overdischarge detection circuit 113, the overcurrent detection circuit 114, and the overheat detection circuit 115 are set separately from one another, and there is no association between these detection items. The control circuit 111 separately evaluates the different output results from the various detection circuits, and switches on/off the discharge control transistor Q1 and the charge control transistor Q2 based on the evaluation.

However, some detection items may affect other detection items. Particularly, when the temperature of the secondary battery 102 is high, the voltage detection level for detecting overcharge is preferably set to a low value in order to mitigate damage inflicted on the secondary battery 102.

When the temperatures of the discharge control transistor Q1 and the charge control transistor Q2 are high, the overcurrent detection levels while charging and discharging are preferably set to low values. Conversely, when the temperatures of the discharge control transistor Q1 and the charge control transistor Q2 are low, the overcurrent detection levels while charging and discharging are preferably increased to high values.

SUMMARY OF THE INVENTION

The present invention provides a secondary battery protection semiconductor device for protecting a secondary battery in which one or more of the above-described disadvantages are eliminated.

A preferred embodiment of the present invention provides a secondary battery protection semiconductor device for protecting a secondary battery, in which the detection level of a certain detection item is changed in accordance with the detection output result of another detection item if these detection items affect each other, thereby mitigating the damage inflicted on the secondary battery and also achieving the full potential of the secondary battery.

According to an aspect of the present invention, there is provided a secondary battery protection semiconductor device for protecting a secondary battery, wherein the secondary battery protection semiconductor device protects the secondary battery by detecting values of at least plural detection items corresponding to the secondary battery including the detection items of overcharge, overdischarge, charge overcurrent, discharge overcurrent, short-circuit current, and overheat; comparing the detected values with corresponding detection levels that are determined beforehand for each of the detection items; and based on the comparison results, turning on/off a discharge control transistor and a charge control transistor that are series-connected to the secondary battery, wherein among the plural detection items, a first value of a first detection item is detected, and a detection level of a second detection item is changed in accordance with the first value.

According to one embodiment of the present invention, a secondary battery protection semiconductor device for protecting a secondary battery is provided, in which the detection level of a certain detection item is changed in accordance with the detection output result of another detection item if these detection items affect each other, thereby mitigating the damage inflicted on the secondary battery and also achieving the full potential of the secondary battery.

BRIEF DESCRIPTION OF THE DRAWINGS

Other objects, features and advantages of the present invention will become more apparent from the following detailed description when read in conjunction with the accompanying drawings, in which:

FIG. 1B is a block diagram of the secondary battery protection semiconductor device according to an embodiment of the present invention;

DETAILED DESCRIPTION OF THE PREFERRED EMBODIMENTS

A description is given, with reference to the accompanying drawings, of an embodiment of the present invention.

Figure 1A:
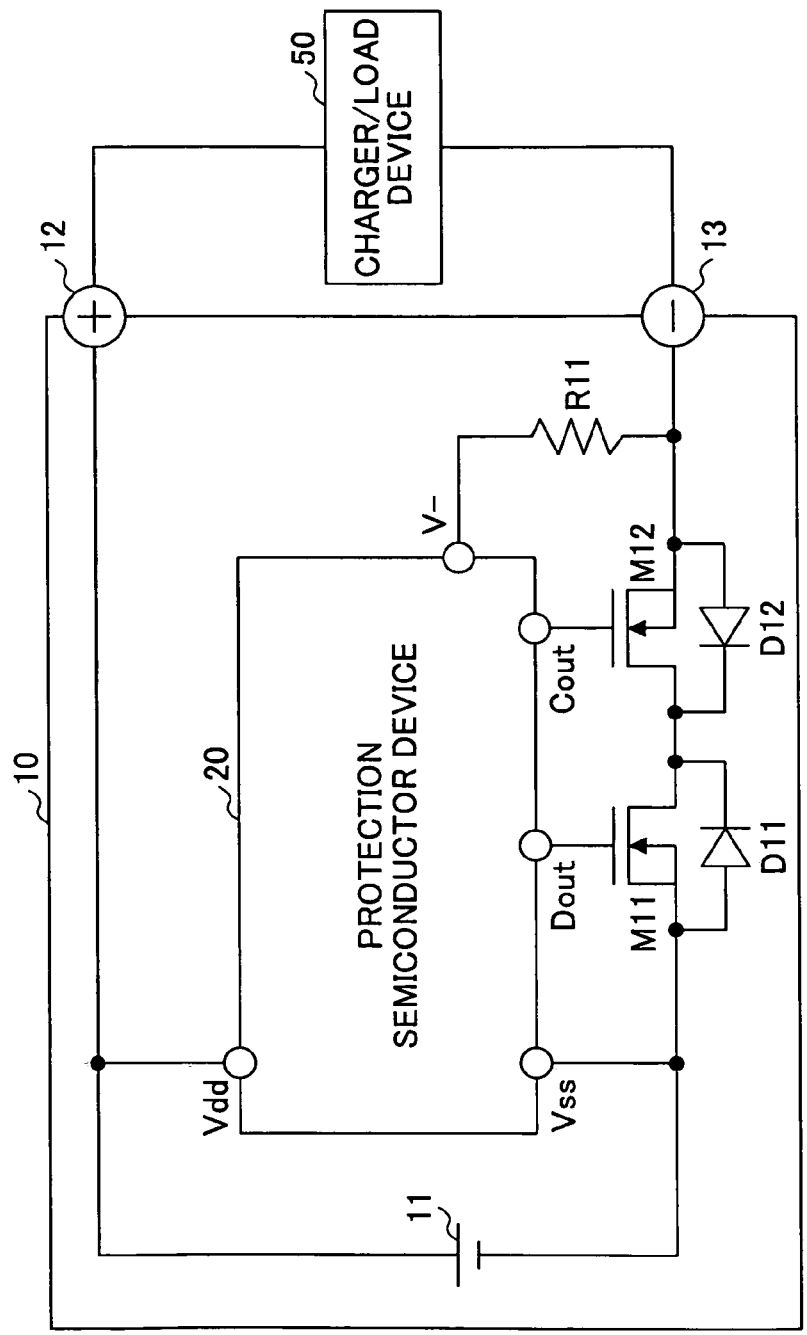
FIG. 1A illustrates a battery pack with a built-in secondary battery protection semiconductor device according to an embodiment of the present invention.

FIG. 1A illustrates a battery pack 10 including a protection semiconductor device 20 for protecting a secondary battery according to an embodiment of the present invention, and FIG. 1B is a block diagram of the protection semiconductor device 20 shown in FIG. 1A.

As shown in FIG. 1A, the battery pack 10 includes the secondary battery protection semiconductor device (protection semiconductor device in FIG. 1A) 20, a secondary battery 11, an NMOS transistor for discharge control M11, an NMOS transistor for charge control M12, a resistor R11, a positive terminal 12, and a negative terminal 13. A charger/load device (charger or load device) 50 is connected to the positive terminal 12 and the negative terminal 13. Diodes D11 and D12 are parasitic diodes of the NMOS transistor for discharge control M11 and the NMOS transistor for charge control M12, respectively.

The battery pack 10 also includes a terminal Dout for controlling the NMOS transistor for discharge control M11, a terminal Cout for controlling the NMOS transistor for charge control M12, a current detection terminal V− for detecting discharge overcurrent and charge overcurrent, a power source terminal Vdd, and a ground terminal Vss.

The positive terminal of the secondary battery 11 is connected to the power source terminal Vdd of the protection semiconductor device 20 and the positive terminal 12 of the battery pack 10.

The negative terminal of the secondary battery 11 is connected to the ground terminal Vss of the protection semiconductor device 20 and one end of the NMOS transistor for discharge control M11. The other end of the NMOS transistor for discharge control M11 is connected to one end of the NMOS transistor for charge control M12 and the other end of the NMOS transistor for charge control M12 is connected to the negative terminal 13 of the battery pack 10.

The gate of the NMOS transistor for discharge control M11 is connected to the output terminal Dout of the protection semiconductor device 20, and the gate of the NMOS transistor for charge control M12 is connected to the output terminal Cout of the protection semiconductor device 20.

The resistor R11 is connected between the current detection terminal V− of the protection semiconductor device 20 and the negative terminal 13 of the battery pack 10. The potential of the current detection terminal V− with respect to the ground terminal Vss is a positive voltage during a discharging operation and a negative voltage during a charging operation.

As shown in FIG. 1B, the protection semiconductor device 20 includes an overcharge detection circuit 202 for detecting an overcharge state, an overdischarge detection circuit 203 for detecting an overdischarge state, an overcurrent detection circuit 204 for detecting an overcurrent state (charge overcurrent and discharge overcurrent states), a short-circuit detecting circuit 205 for detecting a short-circuit current, an overheat detection circuit 206 for detecting an overheat state, a temperature sensor 207 for measuring the temperature, and a control circuit 201 for outputting signals (Cout, Dout) to turn on/off the NMOS transistor for discharge control M11 and the NMOS transistor for charge control M12, in accordance with output signals from these detection circuits.

Figure 2:
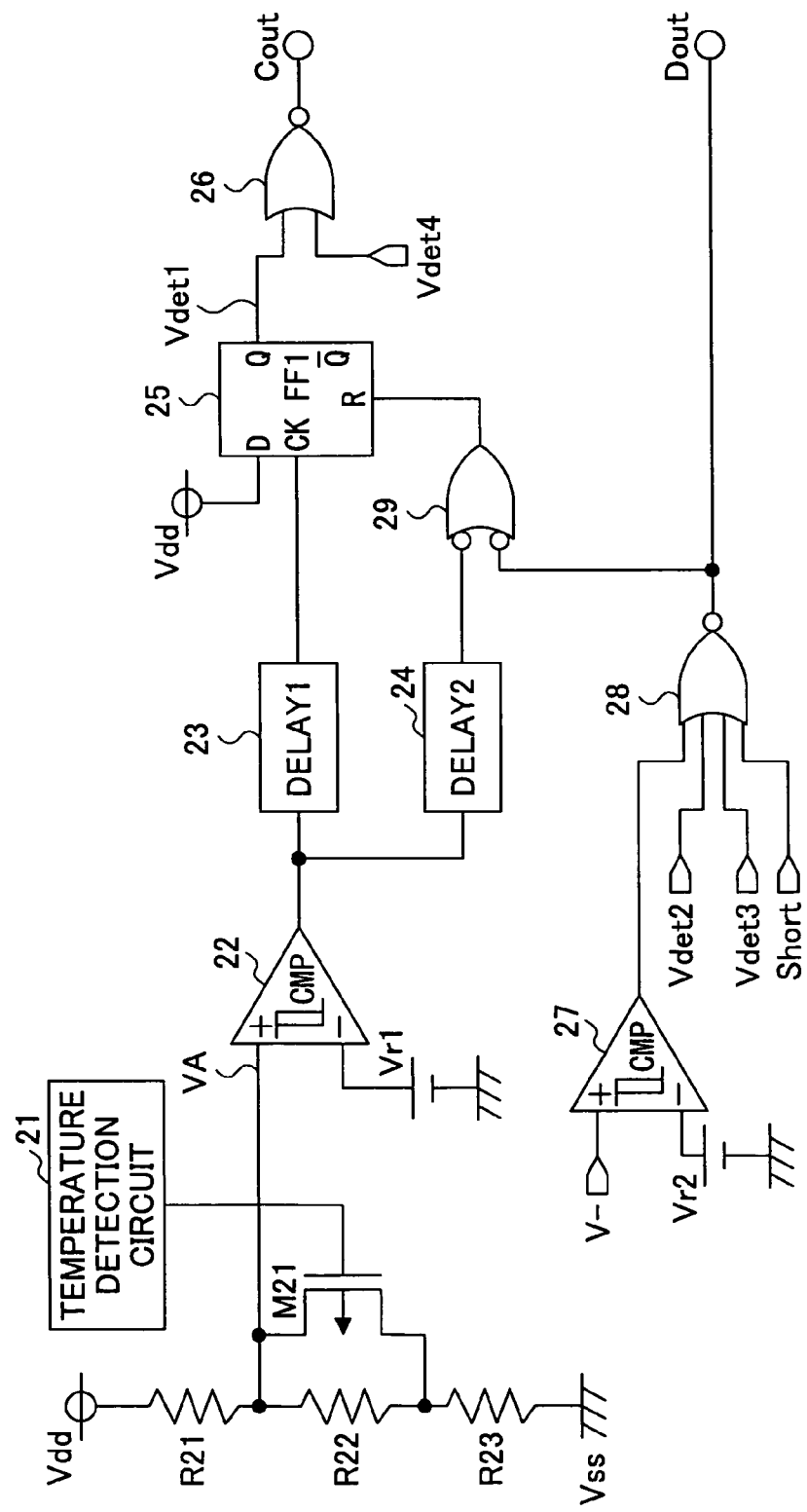
FIG. 2 is a circuit diagram illustrating parts of an overcharge detection circuit and a control circuit according to a first embodiment of the present invention.

FIG. 2 is a circuit diagram illustrating parts of the overcharge detection circuit 202 and the control circuit 201 of the protection semiconductor device 20 according to a first embodiment of the present invention.

As shown in FIG. 2, the overcharge detection circuit according to the second embodiment includes a temperature detection circuit 21, a comparator 22, a reference voltage Vr1, a PMOS transistor M21, and resistors R21 through R23.

The control circuit includes delay circuits 23 and 24, a D-FF (D-type flip flop) 25, a two-input NOR circuit 26, a comparator 27, a four-input NOR circuit 28, a two-input NOR circuit 29, and a reference voltage Vr2.

When the temperature detected by the temperature detection circuit 21 is more than or equal to a predetermined value, the temperature detection circuit 21 increases the level of the temperature detection signal which is an output signal from the temperature detection circuit 21. Such a circuit is conventionally used, and therefore descriptions on detailed circuit configurations are omitted.

The resistors R21 through R23 are series-connected, which are connected between the power source terminal Vdd and the ground terminal Vss. The resistor R22 is parallely-connected to the PMOS transistor M21, and temperature detection signals from the temperature detection circuit 21 are applied to the gate of the PMOS transistor M21.

A voltage VA is output from the connection node of the resistors R21 and R22, which is connected to the non-inverting input of the comparator 22. The reference voltage Vr1 is applied to the inverting input of the comparator 22. Output from the comparator 22 is an overcharge detection signal, which is connected to the inputs of the delay circuits 23 and 24 included in the control circuit.

Output from the delay circuit 23 is connected to a clock input terminal CK of the D-FF 25. Output from the delay circuit 24 is connected to a first input of the two-input NOR circuit 29. Output from the two-input NOR circuit 29 is connected to a reset input terminal R of the D-FF 25. A data input terminal D of the D-FF 25 is connected to the power source terminal Vdd1. An output terminal Q of the D-FF 25 is an overcharge inhibiting signal (signal for turning off the NMOS transistor for charge control M12 when overcharge is detected) Vdet1, which is connected to the first input of the two-input NOR circuit 26. A charge overcurrent inhibiting signal (signal for turning off the NMOS transistor for charge control M12 when charge overcurrent is detected) Vdet4 is connected to the second input of the two-input NOR circuit 26, and output from the two-input NOR circuit 26 is connected to the terminal Cout.

The non-inverting input of the comparator 27 is connected to the current detection terminal V−, and the reference voltage Vr2 is applied to the inverting input of the comparator 27. Furthermore, output of the comparator 27 is connected to the first input of the four-input NOR circuit 28.

An overdischarge inhibiting signal (signal for turning off the NMOS transistor for discharge control M11 when overdischarge is detected) Vdet2 is connected to the second input of the four-input NOR circuit 28, an discharge overcurrent inhibiting signal (signal for turning off the NMOS transistor for discharge control M11 when discharge overcurrent is detected) Vdet3 is connected to the third input of the four-input NOR circuit 28, and a short circuit inhibiting signal (signal for turning off the NMOS transistor for discharge control M11 when short circuit is detected) Short is connected to the fourth input of the four-input NOR circuit 28. Basically similar to the case of the first input, these signals are attained by comparing the current detection terminal V− with the reference voltage corresponding to each signal, with the use of the comparator. Output of the four-input NOR circuit 28 is connected to the second input of the two-input NOR circuit 29 and also to the terminal Dout.

The voltage of the secondary battery 11 is divided by the series-connected resistors R21 through R23, and is output as the voltage VA from the connection node of the resistors R21 and R22. The PMOS transistor M21 is parallely connected to the resistor R22. Therefore, when the PMOS transistor M21 is turned off, the voltage VAoff is obtained by formula 1.

$$VAoff = Vdd(R22+R23)/(R21+R22+R23) \quad \text{(formula 1)}$$

Furthermore, when the PMOS transistor M21 is turned on, the voltage VAon is obtained by formula 2.

$$VAon = Vdd \times R23/(R21+R23) \quad \text{(formula 2)}$$

The temperature detection circuit 21 detects the temperature of the secondary battery 11, or the NMOS transistor for discharge control M11 and the NMOS transistor for charge control M12, or the secondary battery 11 and the NMOS transistor for discharge control M11 and the NMOS transistor for charge control M12. When the detected temperature is lower than a predetermined temperature, the temperature detection circuit 21 outputs a low level temperature detection signal, and when the detected temperature is more than or equal to the predetermined temperature, the temperature detection circuit 21 outputs a high level temperature detection signal.

As a result, when the temperature detection circuit 21 detects a low temperature, the gate of the PMOS transistor M21 is low-level, and therefore the PMOS transistor M21 is turned on. That is, the voltage VA at this state is the voltage VAon indicated by the above formula 2.

When the temperature detection circuit 21 detects a high temperature, the gate of the PMOS transistor M21 becomes high-level, and therefore the PMOS transistor M21 is turned off. That is, the voltage VA changes to the voltage VAoff indicated by the above formula 1.

As indicated by formula 1 and formula 2 above, if the same voltage Vdd of the secondary battery 11 were assigned in formula 1 and formula 2, VAoff>VAon would be satisfied. Accordingly, when the temperature detected by the temperature detection circuit 21 is high, the voltage VA will be high.

In other words, if the voltage VA were equal to the reference voltage Vr1, the voltage Vdd of the secondary battery 11 would be lower when the temperature detection circuit 21 detects high temperature.

The comparator 22 compares the voltage VA with the reference voltage Vr1. When the voltage VA exceeds the reference voltage Vr1, the output changes to high-level, and an overcharge detection signal is output. Therefore, when the temperature detection circuit 21 detects high temperature, an overcharge detection signal is output in response to a lower battery voltage Vdd.

When the input signal changes from low level to high level, the delay circuit 23 delays the input signal by time td1. When the input signal changes from high level to low level, the delay circuit 23 does not delay the input signal. Conversely, when the input signal changes from high level to low level, the delay circuit 24 delays the input signal by time td2. When the input signal changes from low level to high level, the delay circuit 24 does not delay the input signal.

Figure 3:
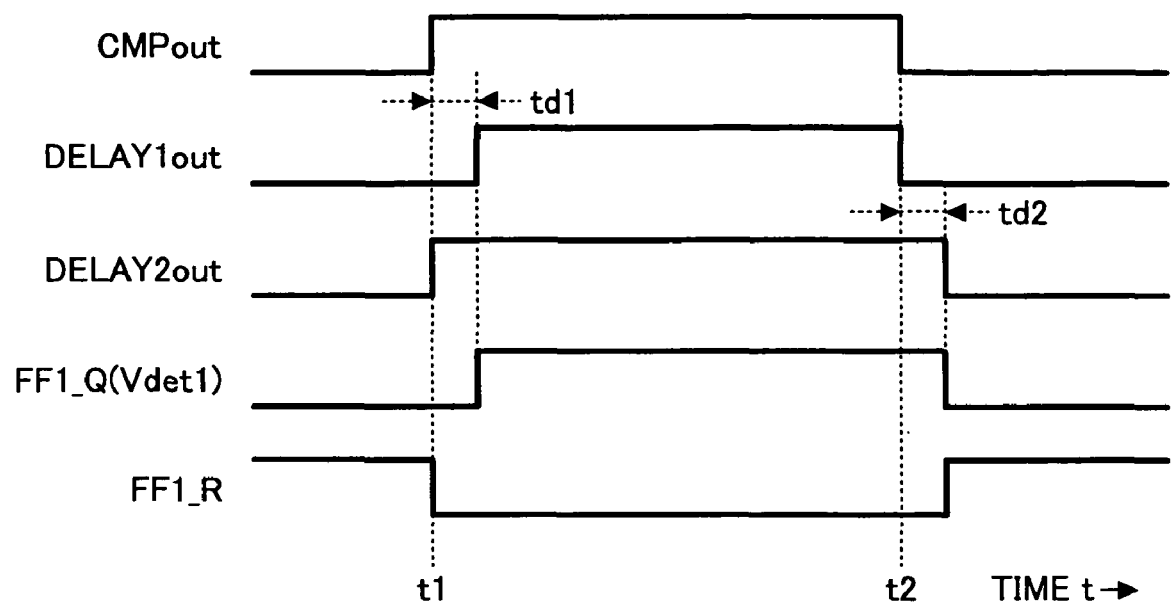
FIG. 3 is a timing chart for describing operations of the circuit diagram shown in FIG. 2.

FIG. 3 is a timing chart for describing operations of the circuit diagram shown in FIG. 2.

Referring to FIG. 3, CMPout is an output signal of the comparator 22, DELAY1out is an output signal of the delay circuit 23, DELAY2out is an output signal of the delay circuit 24, and FF1_Q is an output signal of the output terminal Q of the D-FF 25 and also the overcharge inhibiting signal Vdet1. FF1_R is an input signal of the reset input terminal R of the D-FF 25.

Referring to FIG. 3, before time t1, the voltage VA is lower than the reference voltage Vr1, and the output CMPout of the comparator 22 is low-level. Accordingly, the output DELAY2out of the delay circuit 24 is low level, and the output FF1_R of the two-input NOR circuit 29 is high-level, so that the D-FF 25 is reset.

As a result, the overcharge inhibiting signal Vdet1, which is the output of the output terminal Q of the D-FF 25, becomes low level. The charge overcurrent inhibiting signal Vdet4 is low level unless there is some abnormality, and therefore the output of the two-input NOR circuit 26 becomes high level, and the output of the terminal Cout becomes high level. As a result, the NMOS transistor for charge control M12 is turned on.

A positive reference voltage Vr2 is applied to the inverting input of the comparator 27. As described above, the potential of the current detection terminal V− is negative while charging, and therefore the output of the comparator 27 is low level. Furthermore, while the secondary battery 11 is being charged, the overdischarge inhibiting signal Vdet2, the discharge overcurrent inhibiting signal Vdet3, and the short circuit inhibiting signal Short are all low level. As a result, the output of the four-input NOR circuit 28 is high level, and therefore the terminal Dout is high level, and the NMOS transistor for discharge control M11 is turned on.

The output of the four-input NOR circuit 28 is connected to the second input of the two-input NOR circuit 29, and therefore the second input is usually high level during the charging operation.

When the voltage VA exceeds the reference voltage Vr1 at time t1 and an overcharge state occurs (as described above, when the temperature detection circuit 21 has detected high temperature, an overcharge state occurs in response to a lower battery voltage), and the output CMPout of the comparator 22 changes from low level to high level. Then, the output DELAY2out of the delay circuit 24 immediately changes to high level, and therefore the output FF1_R of the two-input NOR circuit 29 becomes low level, and the D-FF 25 is released from its reset state.

The output signal CMPout of the comparator 22 is delayed by delay time td1 at the delay circuit 23, and is applied to the clock input terminal CK of the D-FF 25. The data input terminal D of the D-FF 25 is connected to the power source terminal Vdd, and therefore the output terminal QVdet1 changes to high level in synchronization with the timing at which the clock input terminal CK changes from low level to high level. This signal is inverted at the two-input NOR circuit 26, and changes the terminal Cout to low level.

The terminal Cout is connected to the gate of the NMOS transistor for charge control M12 as described above. Therefore, the low level terminal Cout turns off the NMOS transistor for charge control M12, thereby cutting the connection between the secondary battery 11 and the charger 50 and stopping the charging operation.

When the charging operation stops, the voltage of the secondary battery 11 will decrease, or the temperature will decrease so that the temperature detection signal goes to low level once again, so that the PMOS transistor M21 is turned on. When the voltage VA decreases to a level below the reference voltage Vr1 at time t2, the output CMPout of the comparator 22 will change from high level to low level. Accordingly, the output DELAY1out of the delay circuit 23 immediately becomes low level once again, and the clock input terminal CK of the D-FF 25 changes from high level to low level, but this time the overcharge inhibiting signal Vdet1 does not change.

The delay circuit 24 delays the output signal of the comparator 22 by delay time td2, and changes the first input of the two-input NOR circuit 29 to low level. Therefore, the output FF1_R of the two-input NOR circuit 29 becomes high level so that the D-FF 25 is reset. Accordingly, the output terminal Q Vdet1 becomes low level. This signal changes the output of the two-input NOR circuit 26 to high level, and therefore the terminal Cout becomes high level and the NMOS transistor for charge control M12 is turned on so that the charging operation is resumed.

A hysteresis voltage is provided at the input of the comparator 22. Therefore, when the charging operation resumes, the voltage AV is somewhat lower than the reference voltage Vr1.

As described above, according to the first embodiment of the present invention, when the secondary battery 11, or the NMOS transistor for discharge control M11 and the NMOS transistor for charge control M12 have high temperature, the battery voltage level at which overcharge is to be detected is decreased by a predetermined voltage. Accordingly, overcharge protection can be reliably performed.

Figure 4:
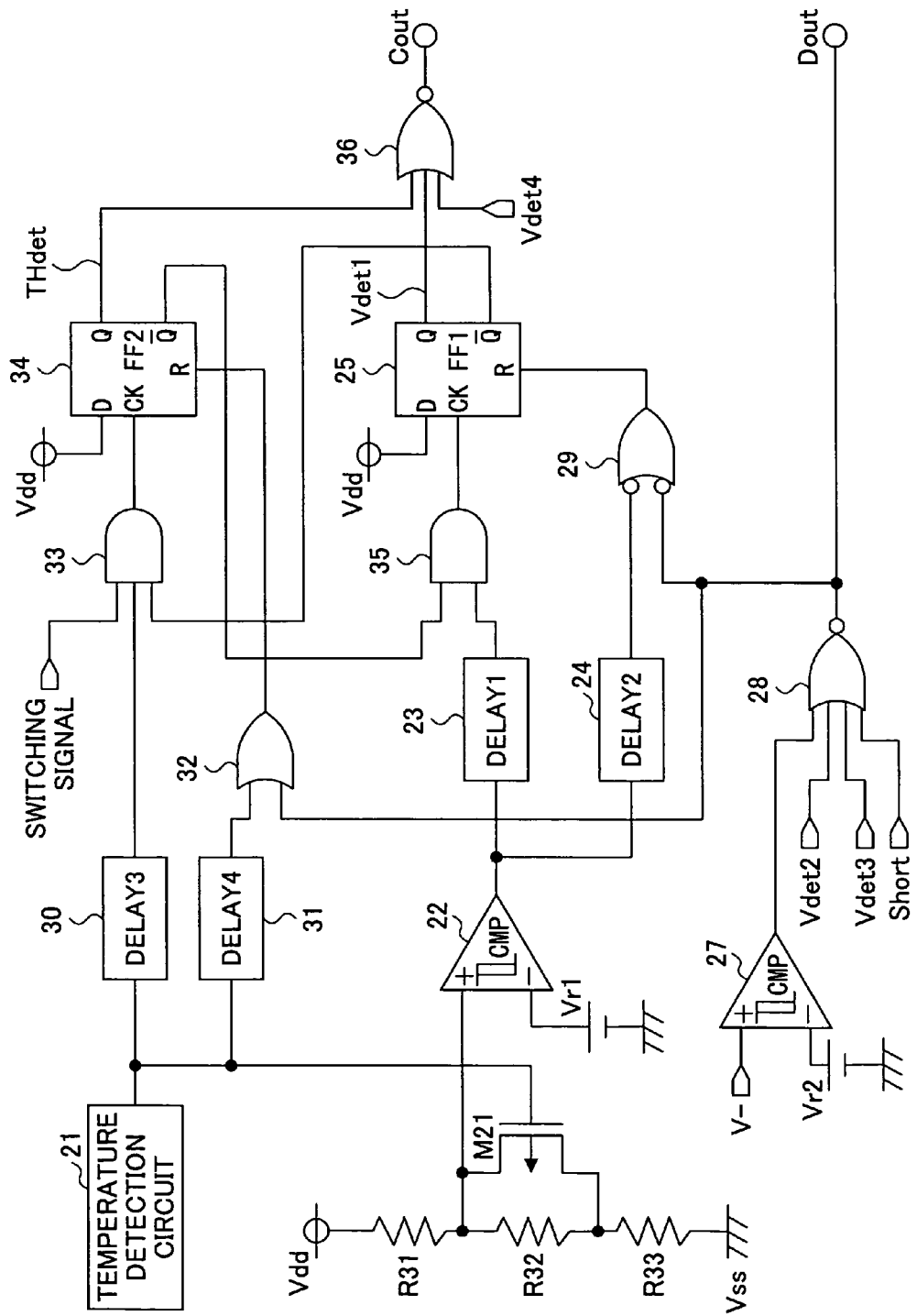
FIG. 4 is a circuit diagram illustrating parts of a temperature detection circuit, an overcharge detection circuit, and a control circuit according to a second embodiment of the present invention.

FIG. 4 is a circuit diagram illustrating parts of a temperature detection circuit, an overcharge detection circuit, and a control circuit according to a second embodiment of the present invention.

In the present embodiment, elements are added to the circuit according to the first embodiment shown in FIG. 1. The additional elements include a control circuit for processing the temperature detection signals which are output from the temperature detection circuit 21. This control circuit includes a delay circuit 30, a delay circuit 31, a two-input NOR circuit 32, a three-input AND circuit 33, a D-FF 34, and a two-input AND circuit 35. Furthermore, the two-input NOR circuit 26 of the first embodiment is replaced with a three-input NOR circuit 36. In FIG. 4, elements corresponding to those in FIG. 2 are denoted by the same reference numbers, and are not further described.

Output of the temperature detection circuit 21 is connected not only to the gate of the PMOS transistor M21 but also to the inputs of the delay circuits 30 and 31. Output of the delay circuit 30 is connected to the second input of the three-input AND circuit 33.

A switching signal is connected to the first input of the three-input AND circuit 33, and the output terminal QB (Q bar) of the D-FF 25 is connected to the third input of the three-input AND circuit 33. The switching signal can be applied from an external terminal, or the protection semiconductor device can be provided with a configuration or a setting unit to which a switching signal of a predetermined voltage level is applied. Output of the three-input AND circuit 33 is connected to a clock input terminal CK of the D-FF 34.

Output of the delay circuit 31 is connected to the first input of the two-input NOR circuit 32. Output of the four-input NOR circuit 28 is connected to the second input of the two-input NOR circuit 32. Output of the two-input NOR circuit 32 is connected to a reset input terminal R of the D-FF 34.

A data input terminal D of the D-FF 34 is connected to the power source terminal Vdd, and an output terminal Q is connected to the first input of the three-input NOR circuit 36. An overheat inhibiting signal THdet is output from the output terminal Q. An output terminal QB of the D-FF 34 is connected to the first input of the two-input AND circuit 35.

The second input of the three-input NOR circuit 36 is connected to the output terminal Q of the D-FF 25, the third input of the three-input NOR circuit 36 is connected to the charge overcurrent inhibiting signal Vdet4, and the output of the three-input NOR circuit 36 is connected to the terminal Cout. The second input of the two-input AND circuit 35 is connected to the output of the delay circuit 23, and the output of the two-input AND circuit 35 is connected to the clock input terminal CK of the D-FF 25.

Similar to the delay circuit 23, the delay circuit 30 delays the input signal only when the input signal has changed from low level to high level. This input signal is delayed by delay time td3. Similar to the delay circuit 24, the delay circuit 31 delays the input signal only when the input signal has changed from high level to low level. This input signal is delayed by delay time td4.

Figure 5:
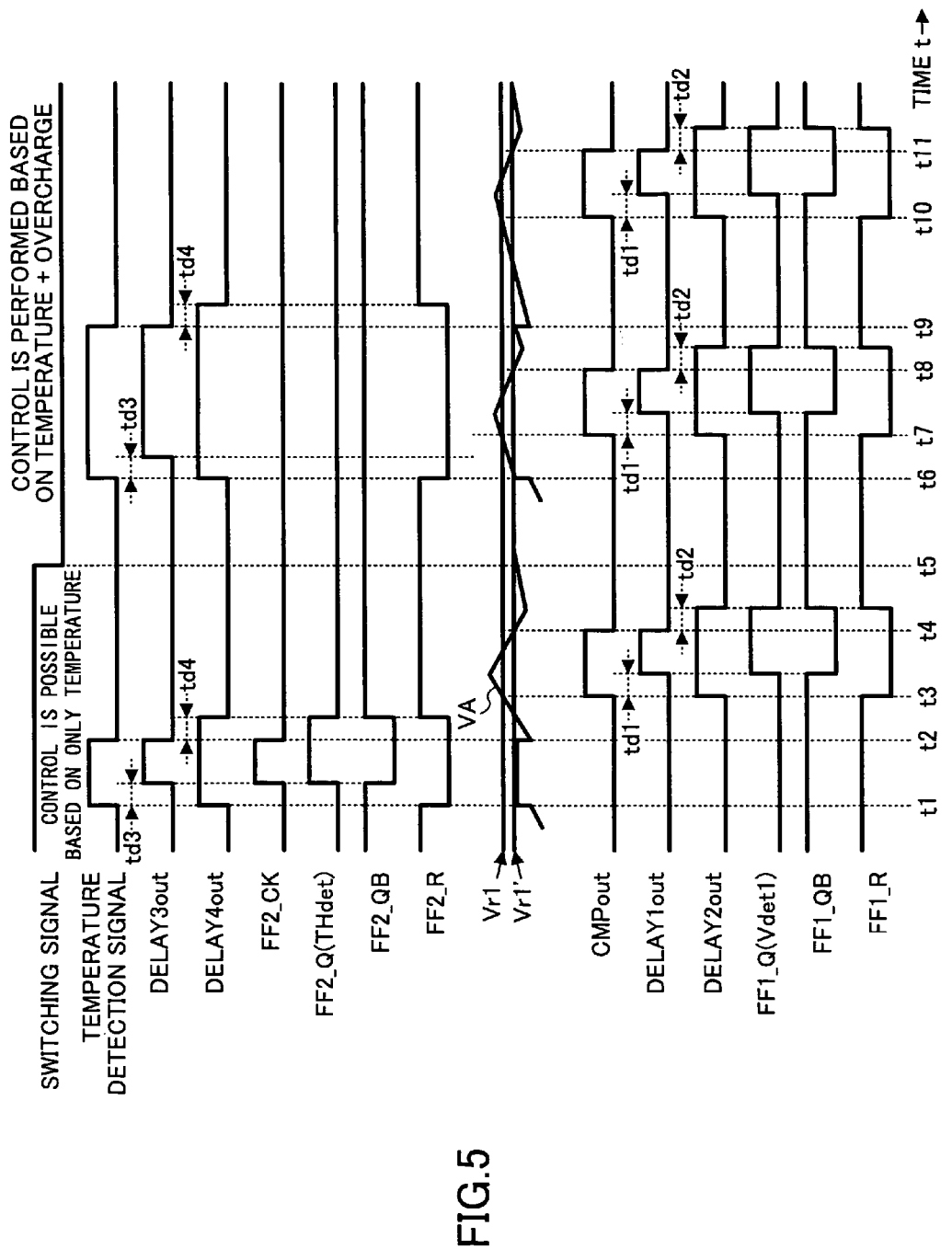
FIG. 5 is a timing chart for describing operations of the circuit diagram shown in FIG. 4.
Figure 6:
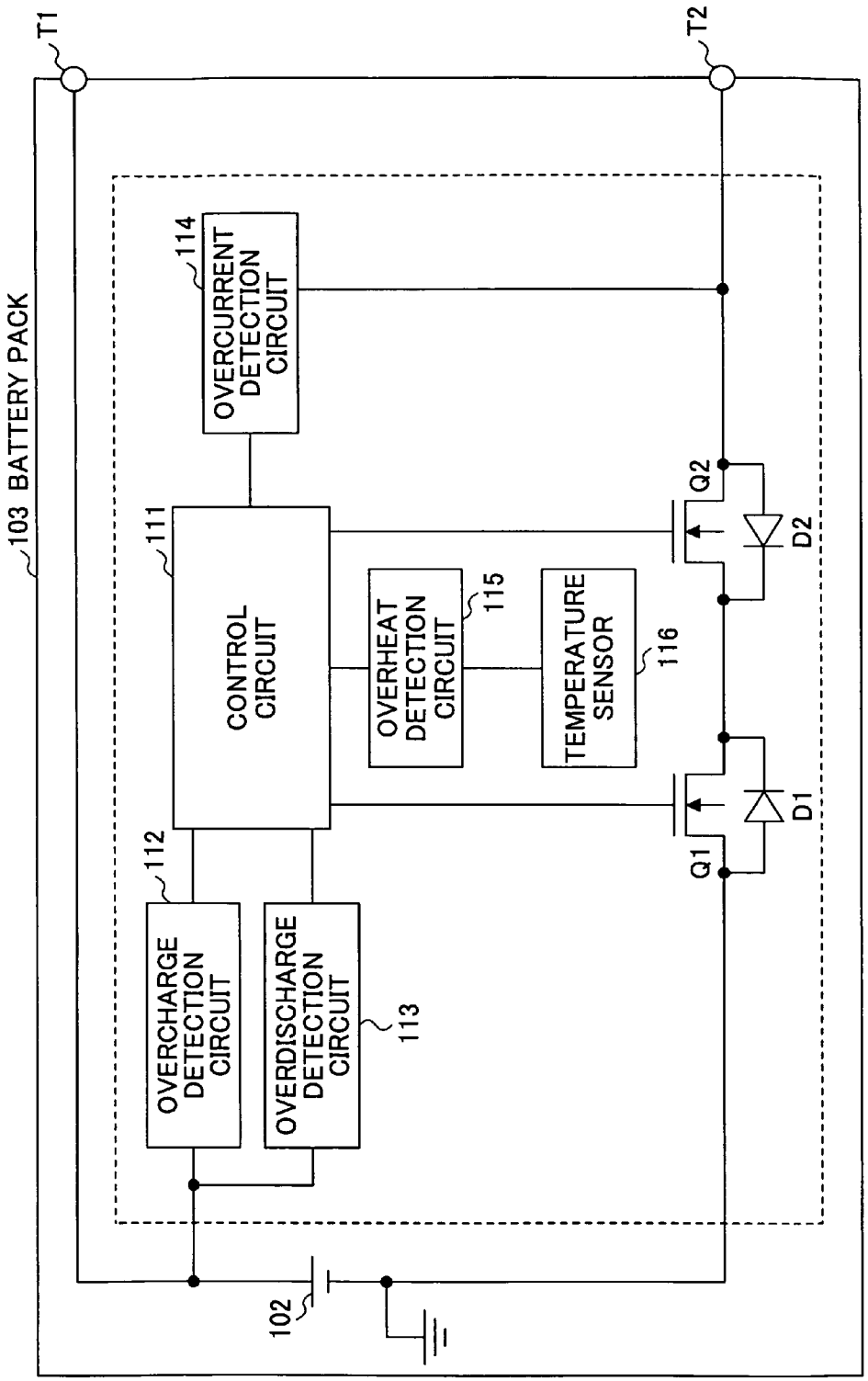
FIG. 6 illustrates a secondary battery protection device for describing the conventional technology.

FIG. 5 is a timing chart for describing operations of the circuit diagram shown in FIG. 4.

A switching signal connected to the first input of the three-input AND circuit 33 is for switching between a first mode and a second mode. The first mode is for stopping the charging operation in the event that the temperature detection circuit 21 outputs a temperature detection signal. The second mode is for changing the battery voltage detection level of the overcharge detection circuit in the event that the temperature detection circuit 21 outputs a temperature detection signal.

When this switching signal is high level, the first mode is selected, and when this switching signal is low level, the second mode is selected. The temperature detection signal is an output signal of the temperature detection circuit 21, which becomes high level in the event that the detected temperature is more than or equal to a predetermined value.

DELAY3out is an output signal of the delay circuit 30 and DELAY4out is an output signal of the delay circuit 31. FF2_CK is an input signal of the clock input terminal CK of the D-FF 34, FF2_Q is an output signal of the output terminal Q of the D-FF 34, FF2_QB is an output signal of the output terminal QB of the D-FF 34, and FF2_R is an input signal of the reset input terminal R of the D-FF 34. Furthermore, FF1_QB is an output signal of the output terminal QB of the D-FF 25.

The voltage Vr1 is a reference voltage. A voltage Vr1' is a reference voltage when the output of the comparator 22 changes from high level to low level. The reference voltage Vr1' is lower than the reference voltage Vr1 by an amount corresponding to the input hysteresis voltage of the comparator 22.

<Description of First Mode>

When the switching signal connected to the first input of the three-input AND circuit 33 is high level, i.e., in a state before time t1 in the first mode, the temperature detected by the temperature detection circuit 21 is low, and the temperature detection signal is low level. The temperature detection signal is low level, and therefore the PMOS transistor M21 is turned on. Furthermore, the voltage VA is below the reference voltage Vr1.

In this state, the first input of the two-input NOR circuit 32 is low level, and therefore the output of the two-input NOR circuit 32 becomes high level, and the D-FF 34 is reset. Accordingly, the output terminal QTHdet of the D-FF 34 is low level, and the output terminal QB is high level.

The output terminal QB is high level, and therefore the gate of the two-input AND circuit 35 is open. When the gate of the two-input AND circuit 35 is open, the part of the control circuit of the overcharge detection circuit is exactly the same as that of FIG. 2, and therefore the output terminal QVdet1 of the D-FF 25 is low level. Furthermore, the charge overcurrent inhibiting signal Vdet4 is low level, and therefore the output of the three-input NOR circuit 36 becomes high level, and the NMOS transistor for charge control M12 is turned on.

In this state, the output of the four-input NOR circuit 28 is high level as described with reference to FIG. 2, and the NMOS transistor for discharge control M11 is turned on.

At time t1, the temperature detection signal becomes high level. Then, the output DELAY4out of the delay circuit 31 immediately changes to high level. As described above, the second input of the two-input NOR circuit 32 is high level, and therefore the output FF2_R of the two-input NOR circuit 32 becomes low level, and the D-FF 34 is released from its reset state.

Furthermore, the PMOS transistor M21 is turned off, and therefore the voltage VA rises by a predetermined voltage. Even if the voltage VA rises, as long as it is below the reference voltage Vr1, the output of the comparator 22 does not change.

When delay time td3 passes, the output DELAY3out of the delay circuit 30 changes from low level to high level. The first input and the third input of the three-input AND circuit 33 are high level, and therefore when the output of the delay circuit 30 changes to high level, the output FF2_CK of the three-input AND circuit 33 changes from low level to high level.

Due to this signal, i.e., due to the output signal from the three-input AND circuit 33, the output terminal Q of the D-FF 34 which is the overheat inhibiting signal THdet becomes high level. The output terminal QB becomes low level. When the overheat inhibiting signal THdet becomes high level, the output of the three-input NOR circuit 36 becomes low level, and therefore the NMOS transistor for charge control M12 is turned off and the charging operation stops.

When the output terminal QB becomes low level, the first input of the two-input AND circuit 35 becomes low level, and therefore even when an overcharge detection signal is output, it will not reach the clock input terminal CK of the D-FF 25. Accordingly, the Vdet1 signal and the THdet signal will never be output at the same time from the D-FF 25 and the D-FF 34, respectively.

After the temperature detection signal becomes low level once again at time t2, and when delay time td4 passes, the output DELAY4out of the delay circuit 31 becomes low level once again. Then, the output FF2_R of the two-input NOR circuit 32 becomes high level, and the D-FF 34 is reset once again, and therefore the output terminal Q (THdet) becomes low level once again.

Then, the output of the three-input NOR circuit 36 becomes high level, and the NMOS transistor for charge control M12 is turned on, and the charging operation resumes. That is, when the temperature detection circuit 21 detects an overheat state, the charging operation stops, and when the temperature decreases, the charging operation resumes.

The temperature detected by the temperature detection circuit 21 is given hysteresis, and the detection temperature for releasing the reset state is somewhat lower than the temperature for detecting an overheat state.

At time t3, when the voltage VA exceeds the reference voltage Vr1, the output CMPout of the comparator 22 changes from low level to high level. Subsequently, until the voltage VA once again drops below the reference voltage Vr1 at time t4, the same operation as that described with reference to FIG. 2 is performed, and therefore a description thereof is omitted.

However, while the charging operation is inhibited, the output terminal QB of the D-FF 25 is low level, and this signal is connected to the third input of the three-input AND circuit 33. Therefore, even if a temperature detection signal is output during this time, the temperature detection signal will not reach the clock input terminal CK of the D-FF 34. Accordingly, the Vdet1 signal and the THdet signal will never be output at the same time from the D-FF 25 and the D-FF 34, respectively.

<Description of Second Mode>

When the switching signal becomes low level at time t5, the second mode is selected.

At time t6, the temperature detection signal changes from low level to high level. This change releases the D-FF 34 from a reset state. However, the first input of the three-input AND circuit 33 is low level due to the switching signal, and thus does not reach the clock input terminal CK of the D-FF 34. Therefore, the output terminal Q of the D-FF 34 does not change. That is, in the second mode, the charging operation cannot be stopped only with the temperature detection signal. However, the voltage VA will have risen by a predetermined voltage, and therefore the voltage VA becomes equal to the reference voltage Vr1 even when the voltage of the secondary battery 11 is lower than that at time t3.

When the voltage VA exceeds the reference voltage Vr1 at time t7, the output CMPout of the comparator 22 will change from low level to high level. Subsequently, until the voltage VA once again drops below the reference voltage Vr1 at time t8, the same operation as that described with reference to FIG. 2 is performed, and therefore a description thereof is omitted.

At time t9, the temperature detection signal changes from high level to low level. Then, when delay time td4 passes, the reset terminal R of the D-FF 34 becomes high level once again, and the D-FF 34 is reset. However, this does not affect the operation of turning on/off the NMOS transistor for charge control M12 and the NMOS transistor for discharge control M11. Nevertheless, the NMOS transistor for charge control M12 is turned on, and therefore the voltage AV decreases by a predetermined voltage, which increases the battery voltage detection level for detecting an overcharge state.

At time t10, when the voltage exceeds the reference voltage Vr1, the comparator 22 will change from low level to high level. Subsequently, until the voltage VA once again drops below the reference voltage Vr1 at time t11, the same operation as that described with reference to FIG. 2 is performed, and therefore a description thereof is omitted.

As described above, according to the second embodiment of the present invention, when the first mode is selected with the switching signal, either one of the output signal of the temperature detection circuit 21 or the output signal of the overcharge detection circuit may be output. Regardless of which one of these is output, the NMOS transistor for charge control M12 is turned off and the charging operation is stopped. When the second mode is selected, the charging operation cannot be stopped only with the output signal of the temperature detection circuit 21; however, the detection level of the overcharge detection circuit is changed in accordance with the output signal of the temperature detection circuit 21, so that when the temperature is high, an overcharge detection signal is output in response to a lower voltage. Thus, it is possible to select the optimum mode depending on the usage conditions of the battery pack.

In the above embodiments, an example is taken in which the overcharge detection level is changed according to the temperature detection signal of the temperature detection circuit. In a general sense, among plural detection items, the detection level of a certain detection item can be changed in accordance with a detected value of another detection item. Thus, various detailed specifications are possible.

By installing the protection semiconductor device for protecting a secondary battery according to an embodiment of the present invention in a battery pack, and installing such a battery pack in a notebook computer, a PDA (Personal Digital Assistant), etc., overcharge protection can be reliably performed even in an overheat state, the full potential of the secondary battery can be achieved, and a battery pack and an electronic device that are easy to handle can be realized.

According to one embodiment of the present invention, among plural detection items regarding the secondary battery among the detection items of overcharge, overdischarge, charge overcurrent, discharge overcurrent, short-circuit current, and overheat, a first value of a first detection item is detected, and a detection level of a second detection item is changed in accordance with the first value, and therefore the secondary battery can be protected in a detailed manner.

According to one embodiment of the present invention, when the temperature of the secondary battery or the discharge/charge control transistor is high, the battery voltage level at which an overcharge detection is to be made is decreased by a predetermined voltage, and therefore overcharge protection can be reliably performed and the full potential of the secondary battery can be achieved.

According to one embodiment of the present invention, when the first mode is selected with the switching signal, regardless of which one of a temperature detection signal or an overcharge detection signal is output, the NMOS transistor for charge control is turned off and the charging operation is stopped. When the second mode is selected, the charging operation cannot be stopped only with the temperature detection signal; however, the detection level of the overcharge detection circuit is changed in accordance with the temperature detection signal, so that when the temperature is high, an overcharge detection signal is output in response to a lower voltage. Thus, it is possible to select the optimum protection mode depending on the usage conditions of the battery pack.

According to one embodiment of the present invention, applied equipment such as a battery pack and various electronic devices can be achieved, in which overcharge protection can be reliably performed, by taking overheat in consideration.

According to one embodiment of the present invention, there is provided a secondary battery protection semiconductor device for protecting a secondary battery, wherein the secondary battery protection semiconductor device protects the secondary battery by detecting values of at least plural detection items corresponding to the secondary battery including the detection items of overcharge, overdischarge, charge overcurrent, discharge overcurrent, short-circuit current, and overheat; comparing the detected values with corresponding detection levels that are determined beforehand for each of the detection items; and based on the comparison results, turning on/off a discharge control transistor and a charge control transistor that are series-connected to the secondary battery, wherein among the plural detection items, a first value of a first detection item is detected, and a detection level of a second detection item is changed in accordance with the first value. Therefore, the secondary battery can be protected in a detailed manner.

Additionally, according to one embodiment of the present invention, the secondary battery protection semiconductor device includes an overcharge detection circuit configured to output an overcharge detection signal in response to detecting that a voltage of the secondary battery undergoing a charging operation is at least higher than or equal to a first voltage that is determined beforehand; a control circuit configured to stop the charging operation of the secondary battery in response to the overcharge detection signal; and a temperature detection circuit configured to detect at least one of a temperature of the secondary battery and temperatures of the discharge control transistor and the charge control transistor, wherein in the event that the temperature detected by the temperature detection circuit is higher than or equal to a predetermined temperature, the overcharge detection circuit outputs the overcharge detection signal in response to detecting that the voltage of the secondary battery undergoing the charging operation is higher than or equal to a second voltage which is lower than the first voltage. Therefore, overcharge protection can be reliably performed and the full potential of the secondary battery can be achieved.

Additionally, according to one embodiment of the present invention, the secondary battery protection semiconductor device includes an overcharge detection circuit configured to output an overcharge detection signal in response to detecting that a voltage of the secondary battery undergoing a charging operation is at least higher than or equal to a first voltage that is determined beforehand; a control circuit configured to turn off the charge control transistor and stop the charging operation of the secondary battery in response to the overcharge detection signal; and a temperature detection circuit configured to detect at least one of a temperature of the secondary battery and temperatures of the discharge control transistor and the charge control transistor, wherein the secondary battery protection semiconductor device selects a first mode or a second mode in response to a switching signal; in the first mode, in the event that the temperature detected by the temperature detection circuit is higher than or equal to a predetermined temperature, the charge control transistor is turned off and the charging operation of the secondary battery is stopped in response to an output signal of the temperature detection circuit; and in the second mode, in the event that the temperature detected by the temperature detection circuit is higher than or equal to the predetermined temperature, the overcharge detection circuit outputs the overcharge detection signal in response to detecting that the voltage of the secondary battery undergoing the charging operation is higher than or equal to a second voltage which is lower than the first voltage, and the charge control transistor is turned off and the charging operation of the secondary battery is stopped in response to the overcharge detection signal. Therefore, the secondary battery protection semiconductor device can be used for a wider range of applications.

Additionally, according to one embodiment of the present invention, a battery pack uses the above secondary battery protection semiconductor device and an electronic device uses such a battery pack. Therefore, applied equipment can be realized, in which overcharge protection can be reliably performed in consideration of overheat.

The present invention is not limited to the specifically disclosed embodiment, and variations and modifications may be made without departing from the scope of the present invention.

The present application is based on Japanese Priority Patent Application No. 2007-222388, filed on Aug. 29, 2007, the entire contents of which are hereby incorporated herein by reference.

What is claimed is:

1. A secondary battery protection semiconductor device for protecting a secondary battery,
wherein the secondary battery protection semiconductor device protects the secondary battery by detecting values of at least plural detection items corresponding to the secondary battery including the detection items of overcharge, overdischarge, charge overcurrent, discharge overcurrent, short-circuit current, and overheat; comparing the detected values with corresponding detection levels that are determined beforehand for each of the detection items; and based on the comparison results, turning on/off a discharge control transistor and a charge control transistor that are series-connected to the secondary battery, wherein: among the plural detection items, a first value of a first detection item is detected, and a detection level of a second detection item is changed in accordance with the first value, wherein the secondary battery protection semiconductor device comprises a comparator that compares an input voltage with a reference voltage and outputs an overcharge detection signal, a hysteresis voltage being provided at the input voltage;

wherein the secondary battery protection semiconductor device further comprises: an overcharge detection circuit configured to output an overcharge detection signal in response to detecting that a voltage of the secondary battery undergoing a charging operation is at least higher than or equal to a first voltage that is determined beforehand; a control circuit configured to stop the charging operation of the secondary battery in response to the overcharge detection signal; and a temperature detection circuit configured to detect at least one of a temperature of the secondary battery and temperatures of the discharge control transistor and the charge control transistor, wherein: in the event that the temperature detected by the temperature detection circuit is higher than or equal to a predetermined temperature, the overcharge detection circuit outputs the overcharge detection signal in response to detecting that the voltage of the secondary battery undergoing the charging operation is higher than or equal to a second voltage which is lower than the first voltage; and wherein the temperatures detected by the temperature detection circuit are given hysteresis.

2. A battery pack using the secondary battery protection semiconductor device according to claim 1.

3. An electronic device using the battery pack according to claim 2.

4. A secondary battery protection semiconductor device for protecting a secondary battery,
wherein the secondary battery protection semiconductor device protects the secondary battery by detecting values of at least plural detection items corresponding to the secondary battery including the detection items of overcharge, overdischarge, charge overcurrent, discharge overcurrent, short-circuit current, and overheat; comparing the detected values with corresponding detection levels that are determined beforehand for each of the detection items; and based on the comparison results, turning on/off a discharge control transistor and a charge control transistor that are series-connected to the secondary battery, wherein: among the plural detection items, a first value of a first detection item is detected, and a detection level of a second detection item is changed in accordance with the first value, wherein the secondary battery protection semiconductor device comprises a comparator that compares an input voltage with a reference voltage and outputs an overcharge detection signal, a hysteresis voltage being provided at the input voltage;

wherein the secondary battery protection semiconductor device further comprises: an overcharge detection circuit configured to output an overcharge detection signal in response to detecting that a voltage of the secondary battery undergoing a charging operation is at least higher than or equal to a first voltage that is determined beforehand; a control circuit configured to turn off the charge control transistor and stop the charging operation of the secondary battery in response to the overcharge detection signal; and a temperature detection circuit configured to detect at least one of a temperature of the secondary battery and temperatures of the discharge control transistor and the charge control transistor, wherein: the secondary battery protection semiconductor device selects a first mode or a second mode in response to a switching signal; in the first mode, in the event that the temperature detected by the temperature detection circuit is higher than or equal to a predetermined temperature, the charge control transistor is turned off and the charging operation of the secondary battery is stopped in response to an output signal of the temperature detection circuit; and in the second mode, in the event that the temperature detected by the temperature detection circuit is higher than or equal to the predetermined temperature, the overcharge detection circuit outputs the overcharge detection signal in response to detecting that the voltage of the secondary battery undergoing the charging operation is higher than or equal to a second voltage which is lower than the first voltage, and the charge control transistor is turned off and the charging operation of the secondary battery is stopped in response to the overcharge detection signal; and wherein the temperatures detected by the temperature detection circuit are given hysteresis.

5. The secondary battery protection semiconductor device according to claim 4, wherein: the switching signal comprises a signal applied from an external terminal, or a signal generated by a circuit configuration or a setting unit configured to generate a predetermined voltage level.

6. A battery pack using the secondary battery protection semiconductor device according to claim 5.

7. An electronic device using the battery pack according to claim 6.

8. A battery pack using the secondary battery protection semiconductor device according to claim 4.

9. An electronic device using the battery pack according to claim 8.

10. A secondary battery protection semiconductor device for protecting a secondary battery, comprising:
an overcharge detection circuit configured to output an overcharge detection signal in response to detecting that a voltage of the secondary battery undergoing a charging operation is at least higher than or equal to a first voltage that is determined beforehand;
a control circuit configured to stop the charging operation of the secondary battery in response to the overcharge detection signal; and
a temperature detection circuit configured to detect at least one of a temperature of the secondary battery and temperatures of a discharge control transistor and a charge control transistor connected to the secondary battery,
wherein in the event that the temperature detected by the temperature detection circuit is higher than or equal to a predetermined temperature, the overcharge detection circuit outputs the overcharge detection signal in response to detecting that the voltage of the secondary battery undergoing the charging operation is higher than or equal to a second voltage that is lower than the first voltage, and
wherein the temperatures detected by the temperature detection circuit are given hysteresis.

11. A secondary battery protection semiconductor device for protecting a secondary battery, comprising:
an overcharge detection circuit configured to output an overcharge detection signal in response to detecting that a voltage of the secondary battery undergoing a charging operation is at least higher than or equal to a first voltage that is determined beforehand;
a control circuit configured to turn off the charge control transistor and stop the charging operation of the secondary battery in response to the overcharge detection signal; and
a temperature detection circuit configured to detect at least one of a temperature of the secondary battery and temperatures of a discharge control transistor and a charge control transistor connected to the secondary battery,
wherein the secondary battery protection semiconductor device selects a first mode or a second mode in response to a switching signal;
in the first mode, in the event that the temperature detected by the temperature detection circuit is higher than or equal to a predetermined temperature, the charge control transistor is turned off and the charging operation of the secondary battery is stopped in response to an output signal of the temperature detection circuit; and
in the second mode, in the event that the temperature detected by the temperature detection circuit is higher than or equal to the predetermined temperature, the overcharge detection circuit outputs the overcharge detection signal in response to detecting that the voltage of the secondary battery undergoing the charging operation is higher than or equal to a second voltage which is lower than the first voltage, and the charge control transistor is turned off and the charging operation of the secondary battery is stopped in response to the overcharge detection signal, and
wherein the temperatures detected by the temperature detection circuit are given hysteresis.

* * * * *